United States Patent [19]

Burrows et al.

[11] Patent Number: 5,471,759
[45] Date of Patent: Dec. 5, 1995

[54] SPARK PLUG GAUGE WITH GAP ADJUSTER

[75] Inventors: Thomas W. Burrows, West Allis, Wis.; Richard J. Conway, Jr., Middleburg Heights, Ohio

[73] Assignee: A&E Manufacturing Co., Inc., Racine, Wis.

[21] Appl. No.: 292,841

[22] Filed: Aug. 19, 1994

[51] Int. Cl.⁶ .................................. G01B 3/30; B25F 1/00
[52] U.S. Cl. ..................... 33/567; 7/100; 7/164; 33/562
[58] Field of Search ................... 33/501.45, 562, 33/567; 7/100, 164, 166, 170; 81/3.55; 72/458, 459, 479; D8/14, 16, 18; D10/64

[56] References Cited

U.S. PATENT DOCUMENTS

| | | | |
|---|---|---|---|
| D. 255,878 | 7/1980 | Martin | D10/64 |
| 987,703 | 3/1911 | Curtin | 33/562 |
| 1,820,364 | 8/1931 | Pringle | 7/100 |
| 1,985,410 | 12/1934 | Isaacs | 7/100 |
| 2,492,380 | 12/1949 | Duma | 7/100 |
| 2,654,142 | 7/1953 | Schwenzfeier | 7/100 |
| 2,670,643 | 3/1954 | Clark | 7/100 |
| 2,871,741 | 2/1959 | Weisbecker et al. | 7/100 |
| 3,045,354 | 7/1962 | Frauenholtz | 33/567 |
| 3,122,837 | 3/1964 | Wrona | 33/567 |
| 4,589,153 | 5/1986 | Paquette | 7/100 |

*Primary Examiner*—Thomas B. Will
*Attorney, Agent, or Firm*—Rayan, Maki & Hohenfeldt

[57] ABSTRACT

A tool for gauging and adjusting an electrode gap of a spark plug, the spark plug having a center electrode and a side electrode, the side electrode having a free end and a mounted end, with a bend between the two ends. The tool includes an elongated scale portion of substantially constant thickness, having scale indicia on at least one side thereof and an inclined gauge portion extending along at least one side of the scale portion which has a progressively increasing thickness beginning near one end with the thickness of the inclined portion being indicated by the indicia on the scale portion. There is further provided an opening in the tool, which opening has a ledge at one side thereof which partially closes the opening, the opening and ledge being sized and positioned so that the ledge fits in the electrode gap, and the side of the opening opposite the ledge contacts the electrode adjacent to the bend, so that adjustment of the electrode gap is achieved upon application of pressure to the tool to alter the degree of the bend.

9 Claims, 1 Drawing Sheet

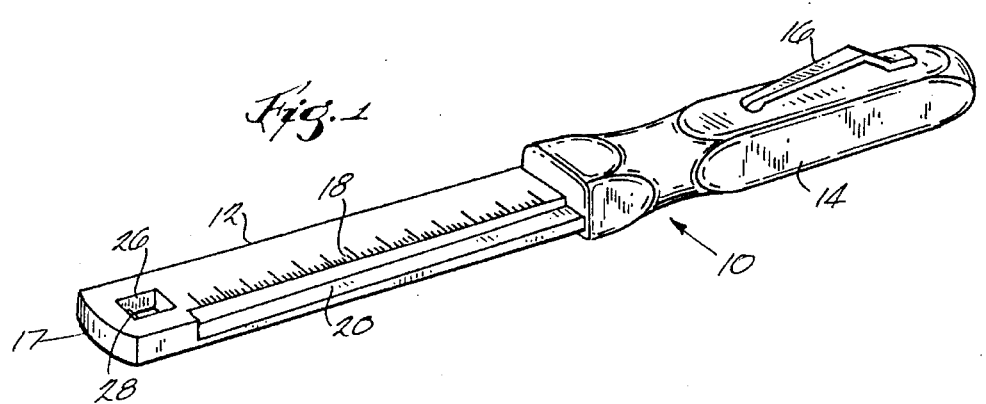
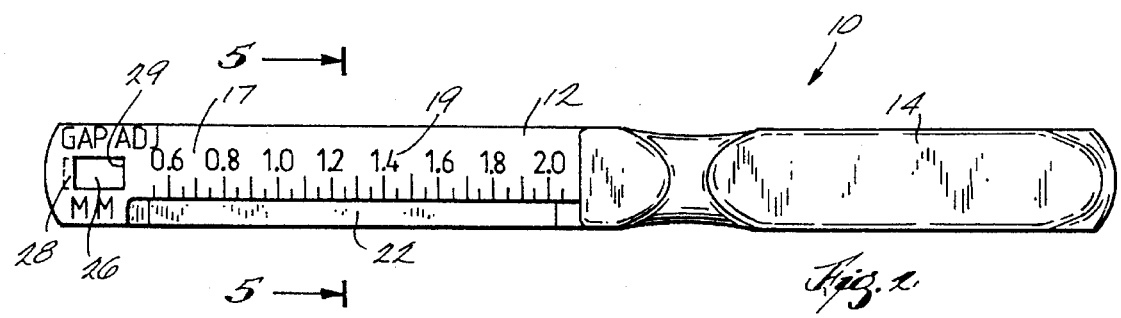
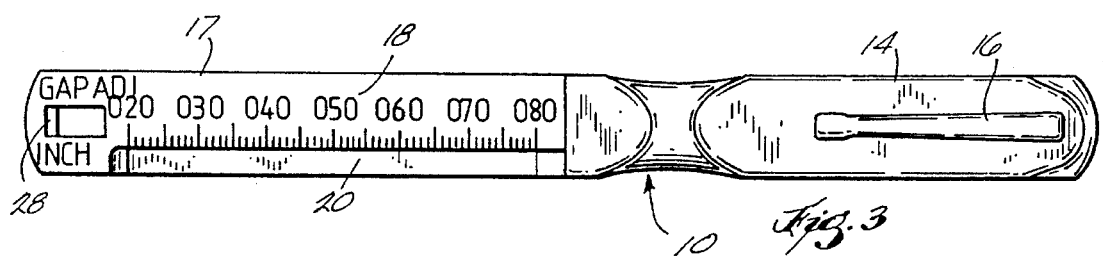
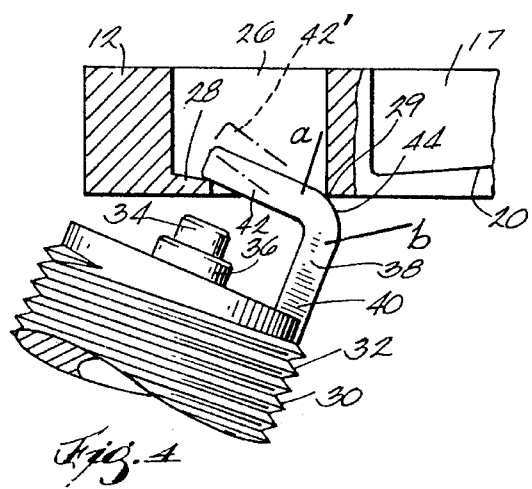
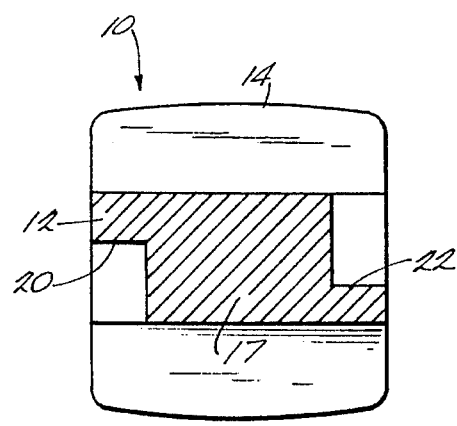

5,471,759

SPARK PLUG GAUGE WITH GAP ADJUSTER

BACKGROUND OF THE INVENTION

This invention relates to hand tools for measuring gaps between spark plug electrodes, and in particular to such tools that also include the ability to adjust the spark plug gap if measurement indicates that the gap is of an incorrect width.

There have in the past been many different types of spark plug gauges. (See, for example, U.S. Pat. Nos. 3,045,354; 2,882,605; and 3,122,837.) An example of a spark plug measuring and adjusting tool is shown in Design Patent No. Des. 255,878, issued Jul. 15, 1980. The latter type gauges include a round opening having an interior ledge circumscribing the opening for adjusting the gap of the spark plug. However, the ledge is sized so that the side electrode is engaged at its point of connection to the body of the spark plug. When force is applied to the tool, a bend point is thus created at the junction of the side electrode with the spark plug body. The electrode shaft can thus be caused to pivot outwardly. Unfortunately, such outward pivoting of the side electrode can cause that electrode to be mis-aligned with the center electrode, reducing the efficiency of the spark plug. This outward pivoting can also cause the side electrode to interfere with insertion of the spark plug into the threaded hole in the engine block. Pressure between the threaded hole and the side electrode will also tend to narrow the gap between the side and center electrodes in this instance. Thus, although the gap between the electrodes is carefully set, the gap width can be inadvertently altered when the spark plug is inserted into the engine block. In view of these shortcomings, a need has continued to exist for an improved spark plug gap measuring and adjusting tool.

SUMMARY OF THE INVENTION

It is an object of the present invention to provide an adjusting tool in which a gauge and adjusting opening for altering the width of the spark plug gap is provided in a single tool. In accordance with a related aspect of the invention, the tool is provided with a handle and preferably a clip for attaching the tool, for example, to a pocket. A principle advantage of the present invention is the provision of a spark plug side electrode bending component that applies force to the side electrode in such fashion that bending occurs in the vicinity of the existing bend in the electrode, rather than at the base of the electrode.

Briefly, the invention provides a tool for gauging and adjusting an electrode gap of a spark plug, the spark plug having a center electrode and a side electrode, the side electrode having a free end and a mounted end, with a bend between the two ends. The tool includes an elongated scale portion of substantially constant thickness, having scale indicia on at least one side thereof and an inclined gauge portion extending along at least one side of the scale portion which has a progressively increasing thickness beginning near one end with the thickness of the inclined portion being indicated by the indicia on the scale portion. There is further provided an opening in the tool, which opening has an internal ledge at one side thereof which partially closes the opening. The opening and ledge are sized and positioned so that the ledge fits in the electrode gap, and the side of the opening opposite the ledge contacts the electrode adjacent to the bend, so that adjustment of the electrode gap is achieved upon application of pressure to the tool to alter the degree of the bend.

Further objects and advantages of the invention will be apparent from the following detailed description and accompanying drawings.

BRIEF SUMMARY OF THE DRAWINGS

FIG. 1 is a perspective view of a tool of the present invention;

FIG. 2 is a bottom view of the tool shown in FIG. 1;

FIG. 3 is a top plan view of the tool of FIG. 1;

FIG. 4 is a fragmentary view of a spark plug and a fragmentary central sectional view of the gap adjusting mechanism of the tool of this invention; and FIG. 5 is a cross-sectional view taken along line 5—5 of FIG. 2.

DETAILED DESCRIPTION OF A PREFERRED EMBODIMENT

Referring more particularly to the drawings, there is seen a tool 10 of this invention. Tool 10 includes a body portion 12 and a handle 14 which is provided with a clip 16 for attaching the tool to a thin supporting surface, for example, a shirt pocket.

Body portion 12 has a central portion 17 of constant uniform thickness which is provided with scales 18 and 19 on its opposite sides. Scale 18 provides a reading indicating the thickness along the length of an inclined or ramp portion 20 which is utilized in known fashion to measure the width of the gap between spark plug electrodes. Scale 19 is located on the opposite side of body portion 17 from scale 18 and is provided to furnish measurements of the thickness of inclined portion 22 in a different linear scale. In the preferred embodiment, scale 18 provides readings in inches as seen in FIG. 3, and scale 19 is provided to give readings in millimeters, as seen in FIG. 2.

Tool 10 also is provided with a gap adjusting means. This means is in the form of an opening 26 preferably rectangular in configuration. Opening 26 is provided on one side, preferably the side of opening 26 furthest from handle 14, with an interior ledge 28 adapted to engage the underside of one of the spark plug electrodes. If desired, the gap adjusting opening can be located elsewhere on the tool. As best seen in FIG. 4, the corner 29 of opening 26 opposite ledge 28 provides a fulcrum point for bending an L-shaped electrode on a standard spark plug 30. Spark plug 30, shown fragmentarily in FIG. 4, is provided, in convention fashion, with threads 32 for securement to a threaded opening in an engine block. Spark plug 30 is provided with a central electrode 34 which is shielded by electrical insulation 36. The opposite electrode 38 is of an L-shaped configuration, as shown. The L-shaped electrode is mounted on the end of spark plug 30 and has a free end 42 extending above the central electrode 34 to provide a gap. It is desirable in setting the gap between electrodes 34 and 42 to cause bending at the junction of the L-shaped segments 44 of electrode 38. This is accomplished in accordance with the invention by providing the opening 26 with dimensions such that corner 29 engages electrode 38 at the bend 44 and ledge 28 is of a thickness such that it will fit between electrodes 34 and 42 of a conventional spark plug. Since there is variation among various spark plugs as to the length of electrode 42, the point of engagement will fall generally between point a and point b as shown in FIG. 4. With this configuration, pivoting of spark plug 30 (clockwise from the vantage point of FIG. 4) increases the width of the gap between electrodes 34 and 42 as illustrated by phantom lines, for example, by electrode 42'. Setting of the spark plug gap is thus achieved without bending the leg of electrode 38 outwardly at junction 40, thus preventing it from extending into the threaded portion of an engine spark plug socket.

The foregoing embodiment is considered illustrative of the principles of the invention. Numerous modifications and adaptations will be apparent to those skilled in the art, and, thus, the invention should not be limited to the exact details of this embodiment but is meant to include all suitable modifications and equivalents falling within the scope of the invention.

What is claimed is:

1. A tool for gauging and adjusting an electrode gap of a spark plug, the spark plug having a center electrode and a side electrode, the side electrode having a free end and a mounted end, with a bend between the two ends, the tool comprising:

an elongated scale portion of substantially constant thickness, having scale indicia on at least one side thereof;

an inclined gauge portion extending along at least one side of the scale portion and having a progressively increasing thickness beginning near one end, the thickness of the inclined portion being indicated by the indicia on the scale portion; and an opening in the tool, the opening having a ledge at one side thereof which partially closes the opening, the opening and ledge being sized and positioned so that the free end of a spark plug electrode extends into the opening and toward one side of the opening and overlying the ledge, and the opposite side of the opening contacts the electrode adjacent to said bend, so that adjustment of the electrode gap is achieved by altering the amount of said bend.

2. A tool as recited in claim 1 further comprising a handle secured to one end of the scale portion.

3. A tool as recited in claim 1 further comprising a handle secured to the end of the scale portion opposite the end from which the inclined portion begins increasing in thickness.

4. A tool as recited in claim 2 further comprising a pocket clip affixed to the handle.

5. A tool as recited in claim 1 further comprising a second inclined portion along the opposite side of the scale portion from the first-mentioned inclined portion.

6. A tool as recited in claim 5 wherein the first-mentioned inclined portion is aligned with one surface of the scale portion and the second inclined portion is aligned with the opposite surface of the scale portion.

7. A tool as recited in claim 1 wherein the opening is formed in the scale portion.

8. A tool as recited in claim 1 wherein the opening is substantially rectangular in shape, and wherein the ledge has an edge that is substantially straight, and wherein the edge of the opening opposite the ledge is substantially straight.

9. A tool as recited in claim 1 wherein the opening is formed in the scale portion nearest the end of the tool at which the inclined portion is at its thinnest.

\* \* \* \* \*